US007216170B2

(12) United States Patent
Ludvig et al.

(10) Patent No.: US 7,216,170 B2
(45) Date of Patent: May 8, 2007

(54) SYSTEMS AND METHODS TO REFERENCE RESOURCES IN A TELEVISION-BASED ENTERTAINMENT SYSTEM

(75) Inventors: Edward Anthony Ludvig, Redwood City, CA (US); Daniel Danker, Sunnyvale, CA (US); Gandhimathi Vaithilingam, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 10/154,622

(22) Filed: May 22, 2002

(65) Prior Publication Data

US 2003/0233451 A1 Dec. 18, 2003

(51) Int. Cl.
G06F 15/173 (2006.01)
(52) U.S. Cl. .................. 709/225; 709/226; 709/229; 725/46; 725/68; 725/100; 725/110; 725/136
(58) Field of Classification Search .................. 725/68, 725/6, 131, 2, 100, 133, 50, 136, 246, 142
See application file for complete search history.

(56) References Cited

U.S. PATENT DOCUMENTS

| | | | |
|---|---|---|---|
| 6,215,483 B1 | 4/2001 | Zigmond | |
| 6,311,197 B2 | 10/2001 | Mighdoll et al. | |
| 6,317,885 B1 | 11/2001 | Fries | |
| 6,338,094 B1 | 1/2002 | Scott et al. | |
| 6,392,664 B1 | 5/2002 | White et al. | |
| 6,502,243 B1 * | 12/2002 | Thomas | 725/110 |
| 6,944,228 B1 * | 9/2005 | Dakss et al. | 375/240.24 |
| 2002/0035728 A1 * | 3/2002 | Fries | 725/68 |
| 2002/0059644 A1 * | 5/2002 | Andrade et al. | 725/136 |
| 2003/0084440 A1 * | 5/2003 | Lownes | 725/6 |
| 2003/0172381 A1 * | 9/2003 | Janevski | 725/46 |

FOREIGN PATENT DOCUMENTS

| | | |
|---|---|---|
| EP | 0 837 599 A2 | 4/1998 |
| WO | WO 01/63806 A2 | 8/2001 |
| WO | WO 01/78390 A1 | 10/2001 |

* cited by examiner

*Primary Examiner*—Yves Dalencourt
(74) *Attorney, Agent, or Firm*—Lee & Hayes, PLLC

(57) ABSTRACT

The described implementations provide for referencing locally and remotely deployed resources in a television-based entertainment system. The entertainment system includes a content provider or network server. The network server accesses a digital broadcast network via any one of multiple different digital broadcasting protocols. The network server distributes source content to a head end component of the system, which in turn distributes the source content to a client device such as a set-top box. The source content includes a number of embedded references to resources such as those deployed locally by the set-top box and/or deployed remotely by the network server. The set-top box utilizes a mapping table to determine actual values of syntactical abstractions in syntax of the embedded references to access and/or launch at least one locally or remotely deployed resource.

44 Claims, 5 Drawing Sheets

SYSTEMS AND METHODS TO REFERENCE RESOURCES IN A TELEVISION-BASED ENTERTAINMENT SYSTEM

TECHNICAL FIELD

This invention relates to referencing resources in television-based entertainment systems.

BACKGROUND

To meet the many sophisticated market-driven needs of television broadcast consumers, middleware platform providers such as those that communicate content data to subscriber set-top boxes need to access content (i.e., applications/data) that are deployed across multiple heterogeneous broadcast and Web enabled networks. These networks are generally based on a respective U.S. or European industry digital broadcast standard including, for example, Digital Video Broadcasting (DVB) (including DVB-C (cable), DVB-T (terrestrial), and DVB-S (satellite)); OpenCable™ Applications Platform (OCAP); Advanced Television Systems Committee (ATSC); National Television Standards Committee (NTSC); GI Motorola network; Multimedia Home Platform (MHP) standards; and so on.

Before distributing content to low resource clients such as set top boxes, middleware providers generally pre-process the content. Such pre-processing includes, for example, parsing all referenced content (i.e., Uniform Resource Identifiers (URIs)) embedded in content to ensure that embedded URI syntax conforms to the specific syntax required by the network wherein the referenced content is deployed. To accomplish this, a separate URI schema must be maintained at the middleware provider for each supported network. That is, if the provider supports content referencing across n networks, the provider needs to maintain and resolve URI syntax against each of the n separate/distinct schemas to ensure that each network's required syntax is enforced.

If a middleware provider is to remain competitive and meet the needs of television consumers, the provider needs to enforce URI syntax against at least a portion of different schemas required by respective different network standards. Unfortunately, procedures to maintain multiple separate/distinct schemas for each supported network are typically time consuming, labor intensive, and expensive. Additionally, parsing URI syntax against multiple separate/distinct schemas is processing and memory intensive.

Moreover, in a low-resource environment (meaning that a client such as a cable and satellite set-top box has limited memory and/or processing resources), the amount of memory reserved for program data is limited. Making this situation more difficult, content providers develop embedded applications for hosting by low resource clients that reference content deployed on multiple different networks. Since each different network has respective URI syntax resolution semantics, these applications must include mechanisms to resolve the specific semantics of one or more different URI syntaxes. This increases application program size and processing requirements, both of which are contrary to substantially optimal program data requirements of a low resource (i.e., memory and/or processing resources) client.

The following described arrangements and methodologies address these and other limitations of referencing content in a television-based entertainment system.

SUMMARY

The described implementations provide for referencing locally and remotely deployed resources in a television-based entertainment system. The entertainment system includes a content provider or network server. The network server accesses a digital broadcast network via any one of multiple different digital broadcasting protocols. The network server distributes source content to a head end component of the system, which in turn distributes the source content to a client device such as a set-top box. The source content includes a number of embedded references to resources such as those deployed locally by the set-top box and/or deployed remotely by the network server. The set-top box utilizes a mapping table to determine actual values of syntactical abstractions in syntax of the embedded references to access and/or launch at least one locally or remotely deployed resource.

BRIEF DESCRIPTION OF THE DRAWINGS

The same numbers are used throughout the drawings to reference like features and components.

FIG. 2 shows aspects of a client device to host an application that resolves a single TS URL syntax to access network resources; the single TS URL syntax being used independently of whether the network resources are deployed across multiple networks based on different digital broadcast standards.

DETAILED DESCRIPTION

The following discussion is directed to television entertainment systems, such as interactive TV networks, cable networks that utilize electronic program guides, and Web-enabled TV networks. Clients in such systems range from full-resource clients with substantial memory and processing resources (e.g., TV-enabled personal computers, TV recorders equipped with hard-disks) to low-resource clients with limited memory and/or processing resources (e.g., traditional set-top boxes). While aspects of the systems and methods described below can be used in any of these systems and for any types of clients, they are particularly well suited for systems with low-resource clients. Hence, the following discussion describes the systems and methods in the context of a low-resource environment.

The subject matter is described with specificity to meet statutory requirements. However, the description itself is not intended to limit the scope of this patent.

An Exemplary System

Figure 1:
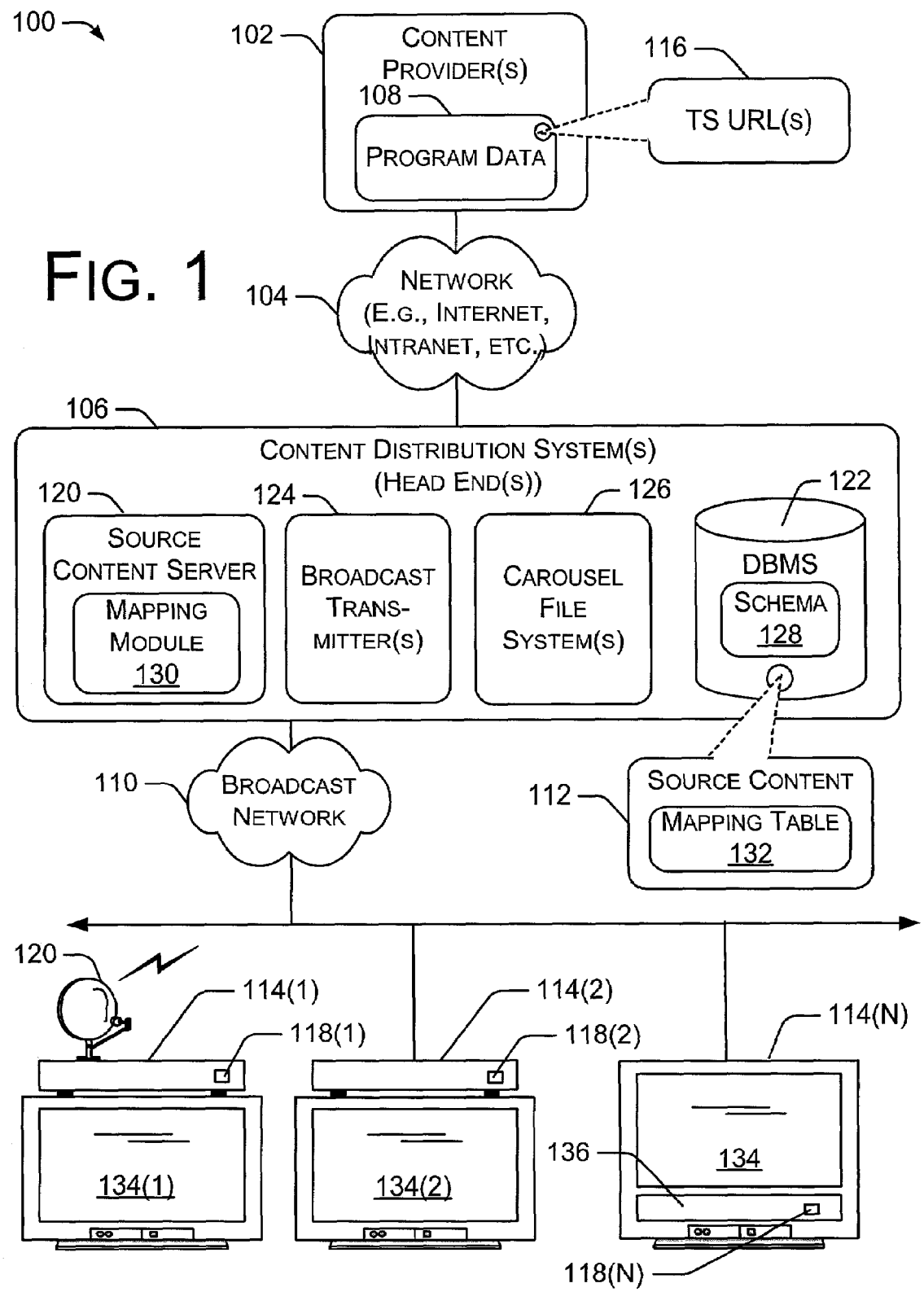
FIG. 1 illustrates an exemplary system to utilize a resource referencing mechanism to integrate and access resources in television-based entertainment networks such as cable, terrestrial, and/or satellite networks.

FIG. 1 illustrates an exemplary system 100 to utilize a resource referencing mechanism to integrate and access resources in television-based entertainment networks such as cable, terrestrial, and/or satellite networks. The system 100 includes a content provider 102 coupled across a network 104 (e.g., the Internet, an Intranet, and/or any other system that transmits any combination of information such as voice, video, and/or data) to a content distribution system 106 or head end. Content provider 102 distributes program data 108 over the network 104 to the head end 106 for subsequent distribution across broadcast network 110 as one or more electronic source files 112 to any number of client devices 114 (e.g., 114(1), 114(2), . . . , 114(N)).

The broadcast network 110 can be any type of network, using any type of network topology and any network communication protocol, represented or otherwise implemented as a combination of one or more networks. For instance, broadcast network 110 may include a Web-enabled TV network, a cable television network, RF, microwave, satellite, and/or other data network including wired or wireless media.

Content provider 102 includes any number of network servers (not shown) that distribute program data 110 to any number of head end systems 106. Such servers include, for example, a Web server, an EPG server, and/or other servers such as a VOD server, a VOM server, etc. As used throughout this discussion, program data 108 represents information that facilitates ITV functionality for any combination of networks (e.g., cable, terrestrial, and/or satellite networks). One or more "transport stream (TS) Universal Resource Locators (URLs)" 116 are embedded into program data content (e.g., an application and/or other ITV data content, for example, EPG, VOD, VOM, Web page (HTML), MPEG, and/or other data) by a content author.

A TS URL 116 is a resource referencing mechanism through which applications 118 hosted by client device 114 can access virtually any type of resource that is accessible via a digital or analog tuner. Such resources include software and/or hardware resources. Additionally, such resources can be deployed on a network that is based on substantially any combination of the various U.S. or European industry digital broadcast standards (e.g., DVB, OCAP, ATSC, GI Motorola, etc.).

For instance, TS URLs 116 can be utilized by an application (e.g., EPG, VOD, Web browser, MPEG, etc.) hosted by client device 114 to tune to any combination of the following resources:

specific transport streams on a particular broadcast network 110 (cable, terrestrial, satellite);
services (e.g., MPEG services) on a transport stream;
an elementary stream within a service;
a carousel (in-band or out-of-band) on a transport stream;
an object or file on a carousel;
an application either on a current transport stream or any other transport stream.

For example, consider that an EPG application executing at client device 114 displays EPG data that embeds a TS URL 116 that references a TV program. Upon user selection of graphics or text aspects of the EPG data that correspond to the embedded TS URL, the client device tunes to the resource identified by the TS URL, which in this example, is a TV program.

In another example, consider that a point-to-point connection from the client device to a Web server 102 is providing Hypertext Markup Language (HTML) content to a Web browser application hosted by the client device. A TS URL 116 referencing EPG data and a corresponding EPG application is embedded in the HTML content. Upon selection of the embedded TS URL (e.g., programmatic or user selection of graphics or text aspects of HTML data that correspond to the TS URL), the client device 112 will launch the referenced EPG application and tune to the EPG data resource identified by the TS URL, which in this example, is being communicated over a broadcast network and not being communicated over a point-to-point connection.

These are only a couple of examples of how TS URL 116 referencing mechanisms are utilized by applications hosted on a client device 114. TS URL syntax and semantics of resolution (described in greater detail below in reference to TS URL schema 128 and semantics mapping table 132) can be used to reference and access substantially any types of resource in a television-based entertainment system.

Content distribution system 106 represents a head end service to distribute source content files 112 across broadcast network 110 to multiple subscribers or client devices 114. Head end 106 includes a number of components consisting of source content server(s) 120, database management system(s) (DBMS) 122, carousel file system(s) 124, and broadcast transmitter(s) 126. Although only single instances of components 120–126 are shown, each respective head end 106 of system 100 may include any number of each of these respective components 120–126.

To receive program data 108 (e.g., EPG, VOD, VOM, and/or any other data), source content server 120 directly communicates to specified content provider URL(s). Source server 120 stores received program data, into DBMS 122. The DBMS 122 utilizes a single TS URL schema 128 to enforce a single syntax against any TS URL(s) 116 embedded in received program data 108. This single TS URL syntax provides a generic mechanism for referencing resources/content across substantially all broadcast networks such as networks based on different standards (e.g., DTB, OCAP, ATSC, GI Motorola, MHP, etc.). This is in contrast to conventional content referencing mechanisms used to reference content across multiple networks with different digital broadcast standards, wherein multiple schemas are required to resolve the syntax and semantics of the content referencing mechanisms-one independent schema for each standard. Exemplary TS URL syntax is described in greater detail below in the section titled "An Exemplary TS URL Schema 128".

Source content server 120 utilizes broadcast transmitter 126 to transmit received program data over the broadcast network 110 to multiple client devices. For example, distribution system 106 utilizes carousel file system 124 to periodically communicate the mapping table 132, EPG data, application metadata, and the like over out-of-band (OOB) channels to client devices. Other program data such as VOD, movies, VOM, and so on, is repeatedly broadcast over in-band channels to client devices.

Source content server 120 includes mapping module 130 to generate semantics mapping table 132. Mapping module 130 can be any type of computer program that provides a user interface (text, graphics, or voice driven) for a human being to input or edit semantics mapping table information. The semantics mapping table is communicated by the source content server over an OOB channel on broadcast network 110 to client devices 114. Applications (e.g., EPG, VOM, Browser, etc.) hosted by client device use the communicated semantics mapping table to resolve syntax semantics of TS URLs embedded in received source content 112. Resolution of TS URL syntax is described in greater detail below in reference to the section titled "An Exemplary Semantics Mapping Table 132".

The mapping module 130 can be used to periodically verify, edit, and/or otherwise modify information in semantics mapping table 132. If mapping table 132 is updated, the updated version is communicated over the broadcast network 110 to client devices 114.

Client devices 114 are implemented in a number of ways. For example, a client device 114(1) receives broadcast content from a satellite-based transmitter via a satellite dish 120. Client device 114 (1) is also referred to as a set-top box or a satellite receiving device. Client device 114(1) is coupled to a television 134(1) for presenting the content received by the client device (e.g., audio data and video data), as well as a graphical user interface. A particular client device 114 is coupled to any number of televisions 134 and/or similar devices that are implemented to display or otherwise render content. Similarly, any number of client devices 114 can be coupled to a television 134.

Client device 114(2) is coupled to receive broadcast content from broadcast network 110 and provide the received content to associated television 134(2). Client device 114(N) is an example of a combination television 124 and integrated set-top box 126. In this example, the various components and functionality of the set-top box are incorporated into the television, rather than using two separate devices. The set-top box incorporated into the television may receive broadcast signals via a satellite dish (similar to satellite dish 120) and/or via broadcast network 110. In alternate implementations, client devices 114 may receive broadcast signals via the Internet or any other broadcast medium.

Although FIG. 1 shows a single content provider 102 and a single content distribution system 106, system 100 can include any number of content providers coupled to any number of content distribution systems.

Before describing how client device 114 utilizes information in semantics mapping table 132 to access resources referenced by a TS URL 116, exemplary TS URL syntax and structure are described.

An Exemplary TS URL Schema 128

For purposes of this discussion, TS URL 116 is defined in the following name space: "ts://". Angle brackets <and> are used to distinguish TS URL syntax rule names (syntactical components). Optional items are enclosed between meta symbols [and]. Various syntactical structures of TS URLs are expressed through the use of common symbols. For instance Boolean symbols "&" and "|" indicate respective Boolean "AND" and "OR" operations. A question mark symbol "?" is evaluated according to convention such as in the C++ computer programming language. For instance, consider the following syntax: "X?A:B". This example indicates: if X, then A; otherwise, B.

TS URL syntax rules include at least the following combinations of syntactical components illustrated in TABLE 1.

TS URL syntax rules/components of TABLE 1 are defined as follows:

original_network_id—Identifies the original carrier of the transport stream. It serves to distinguish between transport streams that are on a terrestrial network as opposed to a cable to satellite network.

transport_stream_id—Uniquely identifies a transport stream within a terrestrial or cable or satellite network. When a program is re-multiplexed and sent on a different physical channel, as often happens on a cable network, the transport_stream_id may change.

service_id—Uniquely identifies a service or a TV program within a transport stream. During re-multiplexing, a cable operator may choose to change the programs available on that channel and hence a TV program's service_id may change in this process.

PID (packet identifier)—Uniquely identifies an elementary stream within a transport stream and is defined in a DVB program map table (PMT) for each elementary stream in a transport stream. If the PID of an elementary stream is known to be fixed, then an elementary stream can be referenced by its PID instead of its component_tag.

component_tag—Uniquely identifies an elementary stream within a transport stream. It is embedded in the stream identifier descriptor associated with an elementary stream, and remains unchanged even if the PID associated with the elementary stream changes during re-multiplexing. Hence, the component_tag provides a one-to-one mapping to the PID of an elementary stream in a transport stream.

event_id—Uniquely identifies an event within a service; it is the identifier of a TV program described in the DVB SI or ATSC SI tables.

path_segments—Reference an object in an object carousel within the service if the DVB URL identifies a service. If the DVB URL references an elementary stream that carries an object carousel stream, the path references an object in an object carousel whose "root" (DownloadServerInitiate—DSI message) is sent within that elementary stream.

textual_service_identifier—A textual abstraction of <network_id>.<transport_stream_id>.<service_id>.

application_reference—An encoded text string of the application's globally unique identifier. In MHP and OCAP, the application name is generated from the numeric org_id and app_id constituting the application_ identifier of an application. In ATSC-DASE, an application globally unique identifier is already in a string format, thus fitting in well with this approach.

cmd_line—An encoded text string that will contain the command line arguments passed to the application.

TABLE 1

An Exemplary Transport Stream (TS) URL Syntax ts://<original_network_id>.[<transport_stream_id>][.<service_id>
[[.<component_tag>{&<component_tag>}]|[,<pid>{&<pid>}]][;<event_id>]
[:<application_reference>[?<cmd_line>]]{/<path_segments>};
   ts://'<textual_service_identifier>'[[.<component_tag>{&<component_tag>}]
|[,<pid>{&<pid>}]][;<event_id>][:<application_reference>[?<cmd_line>]]
{/<path_segments>}; or
   ts://oob[[.<component_tag>{&<component_tag>}]|[,<pid>{&<pid>}]]
[;<event_id>][:<application_reference>[?<cmd_line>]]{/<path_segments>} oob—A literal text string that refers to the single service carried by the physical out of band transport stream, or to the virtual out of band service carried by all transport streams on a network.

TS URL schema 128 enforces TS URL syntax of TABLE 1 with the following conditions:

If <event_id> is specified, <application_reference> is prohibited.

If <event_id> is specified, <path segments> are prohibited.

If <application_reference> is specified, <path_segments> are prohibited.

The special "ts://oob . . . " form refers to the single service carried by the physical out-of-band transport stream, or the special virtual out-of-band service carried by all transport streams on a particular network.

Based on the above, TS URL 116 syntax can be expressed as

---
ts://<service>[.<components>][<object>], wherein <service> is one of:
<original_network_id>.<transport_stream_id>.<service_id>,
'<textual_service_identifier>, or oob. Additionally, <components> is one of:
<component_tag>{&<component_tag>}, or <pid> {&<pid>}. Moreover,
<object> is one of: <event_id>, <application_reference>[?cmd_line], or
{/path_segments}.

---

TS URL 116 syntax is compatible across a number of different data formats. For instance, TABLE 2 illustrates exemplary TS URL syntax rules in "Backus Naur Form" (BNF).

TABLE 2 shows exemplary TS URL 116 syntax in BNF data format.

TABLE 2

Exemplary TS URL Syntax in BNF Format.

```
ts_url           = ts_scheme ":" ts_net_path
ts_scheme        = "TS"
ts_net_path      = "//" ts_entity
ts_entity        = ts_service | ts_service_component | ts_application | ts_file
ts_service       = ts_service_without_event [ ts_event_constraint ]
ts_service_component = ts_service_without_event "."
elementary_stream_set
elementary_stream_set = component_tag_set | pid_set
ts_service_without_event = original_network_id
"." [transport_stream_id]
         "." service_id |"'" textual_service_identifier "'" | oob
ts_application   = ts_service_without_event
["."elementary_stream_set]":"<application_component>
application_component = <application_reference>[?<cmd_line>]
ts_file          = ts_service_without_event["."elementary_
stream_set] "/" ts_abs_path
component_tag_set = component_tag *("&" component_tag)
pid_set          = pid * ("&" pid)
ts_event_constraint = ";" event_id
original_network_id = hex_string
transport_stream_id = hex_string
service_id       = hex_string
component_tag    = hex_string
Pid              = hex_string
event_id         = hex_string
application_reference = UTF-8 encoded text string
cmd_line         = UTF-8 encoded text string
hex_string       = 1*hex
hex = digit | "A" | "B" | "C" |
"D" | "E" | "F" | "a" | "b" | "c" | "d" | "e" | "f"
digit = "0" | "1" | "2" | "3" | "4" | "5" | "6" | "7" | "8" | "9"
ts_abs_path = path_segments (path_segments as defined in RFC 3396)
```

The following illustrate a few enumerations of an TS URL 116 service:

---
ts://<original_network_id>.<transport_stream_id>.<service_id>,
ts://<textual_service_identifier>, and ts://oob (e.g., ts://345A.2345.2222,
ts://games.microsoft.com, ts://oob.

---

TS URL 116 syntax to reference a program on a service is exemplified by the following enumerations:

---
ts://<original_network_id>.<transport_stream_id>.<service_id>;
event_id; and
ts://'textual_service_identifier';event_id (e.g., ts://345A.2345.2222;
55FF and ts://'games.microsoft.com'; 45FF).

---

The following enumerations demonstrate the elementary stream of the TS URL:

---
ts://<original_network_id>.<transport_stream_id>.<service_id>.
<component_tag>;
ts://<original_network_id>.<transport_stream_id>. <service_id>,
<pid>;
ts://'<textual_service_identifier>'.<component_tag>;
ts://'<textual_service_identifier>',<pid>;
ts://<original_network_id>.<transport_stream_id>.<service_id>.
<component_tag>&<component_tag>; and
ts://<original_network_id>.<transport_stream_id>.<service_id>,
<pid>&<pid>.

---

In a service bound application, the TS URL may be shown in the following enumerations:

---
ts://<original_network_id>.<transport_stream_id>.<service_id>:
<application_reference>?<cmd_line>;
ts://<original_network_id>.<transport_stream_id>.<service_id>.
<component_tag>:<application_reference>?<cmd_line>;
ts://<original_network_id>.<transport stream_id>.<service_id>,
<pid>:<application_reference>?<cmd_line>;
ts://'<textual_service_identifier>':
<application_reference>?<cmd_line>;
ts://'<textual_service_identifier>'.<component_tag>:
<application_reference>; and
ts://'<textual_service_identifier>', <pid>:<application_reference>.

---

The unbound application of the TS URL may be illustrated by the following:

---
ts://oob:<application_reference>;
ts://oob.<component_tag>:<application_reference>?<cmd_line>;
ts://oob,<pid>:<application_reference>?<cmd_line>.

---

(A service unbound application is one that persists even after the currently tuned service is changed to a new service, perhaps on a different transport stream).

The TS URL object on an in-band carousel may be illustrated by these enumerations:

---
ts://<original_network_id>.<transport_stream_id>.<service_id>/
<path segments>;

-continued

```
ts://<original_network_id>.<transport_stream_id>.<service_id>.
<component_tag>/<path segments>;
ts://<original_network_id>.<transport_stream_id>.<service_id>,<pid>/
<path_segments>;
ts://<textual_service_identifier>/<path_segments>;
ts://<textual_service_identifier>.<component_tag>/<path_segments>;
ts://<textual_service_identifier>,<pid>/<path_segments>(e.g,
ts://345A.2345.2222/myDirectory/myFile;
ts://games.microsoft.com/myDirectory/myFile;ts://345A.2345.2222.34/my
Directory/myFile;
ts://345A.2345.2222,7890/myDirectory/myFile;
tv://games.microsoft.com.0x34/ myDirectory/myFile; and
ts://games.microsoft.com,7890/myDirectory/myFile.
```

In terms of an object on an OOB Carousel, the TS URL 116 may be shown by the following enumerations:

```
ts://oob/<path_segments>;
ts://oob.<component_tag>/<path_segments>; and
ts://oob,<pid>/<path_segments>(e.g., ts://oob/myDirectory/myFile; and
ts://oob.34/myDirectory/myFile; and ts://oob,7890/myDirectory/myFile.
```

Selected Components of a Client Device

Selected components of client device 114 are now described. These components are utilized to host an application that resolves a single TS URL 116 syntax to access network resources independent of whether the network resources are deployed across multiple networks based on different digital broadcast standards.

Figure 2:
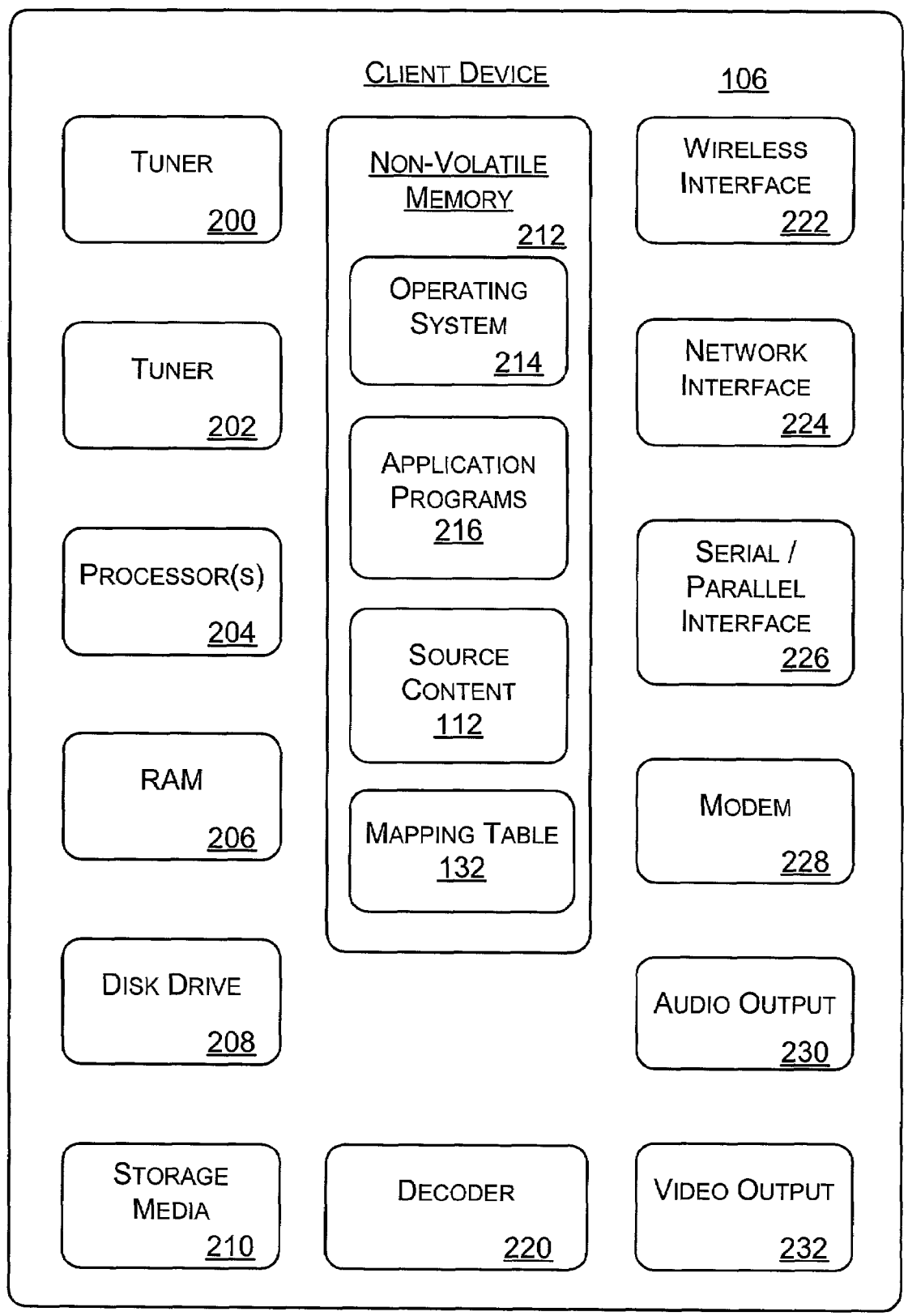
FIG. 2 illustrates selected components of client device of FIG. 1. More particularly.

FIG. 2 illustrates selected components of client device 114 shown of FIG. 1. Client device 114 includes a first tuner 200 and an optional second tuner 202. The tuners 200 and 202 are representative of one or more in-band tuners that tune to various frequencies or channels to receive television signals, as well as an out-of-band tuner that tunes to the broadcast channel over which source content 112 (see also, FIGS. 1 and 5) is broadcast to client device 114.

Client device 114 also includes one or more processors 204 and one or more memory components. Examples of possible memory components include a random access memory (RAM) 206, a disk drive 208, a mass storage component 210, and a non-volatile memory 212 (e.g., ROM, Flash, EPROM, EEPROM, etc.). Alternative implementations of client device 114 can include a range of processing and memory capabilities, and may include more or fewer types of memory components than those illustrated in FIG. 2.

For example, full-resource clients are implemented with substantial memory and processing resources, including the disk drive 208 to store content for replay by the viewer. Low-resource clients, however, may have limited processing and memory capabilities, such as a limited amount of RAM 206, no disk drive 208, and limited processing capabilities.

Processor(s) 204 processes various instructions to control the operation of client device 114 and to communicate with other electronic and computing devices. The memory components (e.g., RAM 206, disk drive 208, storage media 210, and non-volatile memory 212) store various information and/or data such as source content 112, configuration information for client device 114, and/or graphical user interface information.

An operating system 214 and one or more application programs 216 may be stored in non-volatile memory 212 and executed on processor 204 to provide a runtime environment. A runtime environment facilitates extensibility of client device 114 by allowing various interfaces to be defined that, in turn, allow application programs 216 (e.g., program modules) to interact with client device 114.

Application programs 216 that may be hosted at client device 114 include, for example, a browser to browse the Web, an email program to facilitate electronic mail, EPG, VOD, VOM, MPEG, and/or other applications. Application programs access resources identified by corresponding TS URL(s) 116 embedded in portions of source content 112. For instance, a client hosted application 216 can launch any other client hosted application or access application data (either of which may be deployed across different networks based of different respective digital broadcast standards) from presented graphic object or text hotspots that correspond to a TS URL 116.

To resolve semantics of TS URL 116 syntax and access resources from various networks that may be based on different network standards, application programs 216 evaluate information indicated by semantics mapping table 132 of FIG. 1. An exemplary semantics mapping table is described in greater detail below in reference to FIG. 3.

Client device 114 can also include other components pertaining to a television entertainment system which are not illustrated in this example for simplicity purposes. For instance, client device 114 can include a user interface application and user interface lights, buttons, controls, etc. to facilitate viewer interaction with the device.

Client device 114 also includes a decoder 220 to decode a broadcast video signal, such as an NTSC, PAL, SECAM or other TV system video signal. Client device 114 further includes a wireless interface 222, a network interface 224, a serial and/or parallel interface 226, and a modem 228. Wireless interface 222 allows client device 114 to receive input commands and other information from a user-operated input device, such as from a remote control device or from another IR, Bluetooth, or similar RF input device.

Network interface 224 and serial and/or parallel interface 226 allow client device 114 to interact and communicate with other electronic and computing devices via various communication links. Although not shown, client device 114 may also include other types of data communication interfaces to communicate with other devices. Modem 228 facilitates client device 114 communications with other electronic and computing devices via a conventional telephone line.

Client device 114 also includes an audio output 230 and a video output 232 that provide signals to a television or other device that processes and/or presents or otherwise renders the audio and video data. Although shown separately, some of the components of client device 114 may be implemented in an application specific integrated circuit (ASIC). Additionally, a system bus (not shown) typically connects the various components within client device 114. A system bus is implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

An Exemplary TS URL Semantics Mapping Table 132

Figure 3:
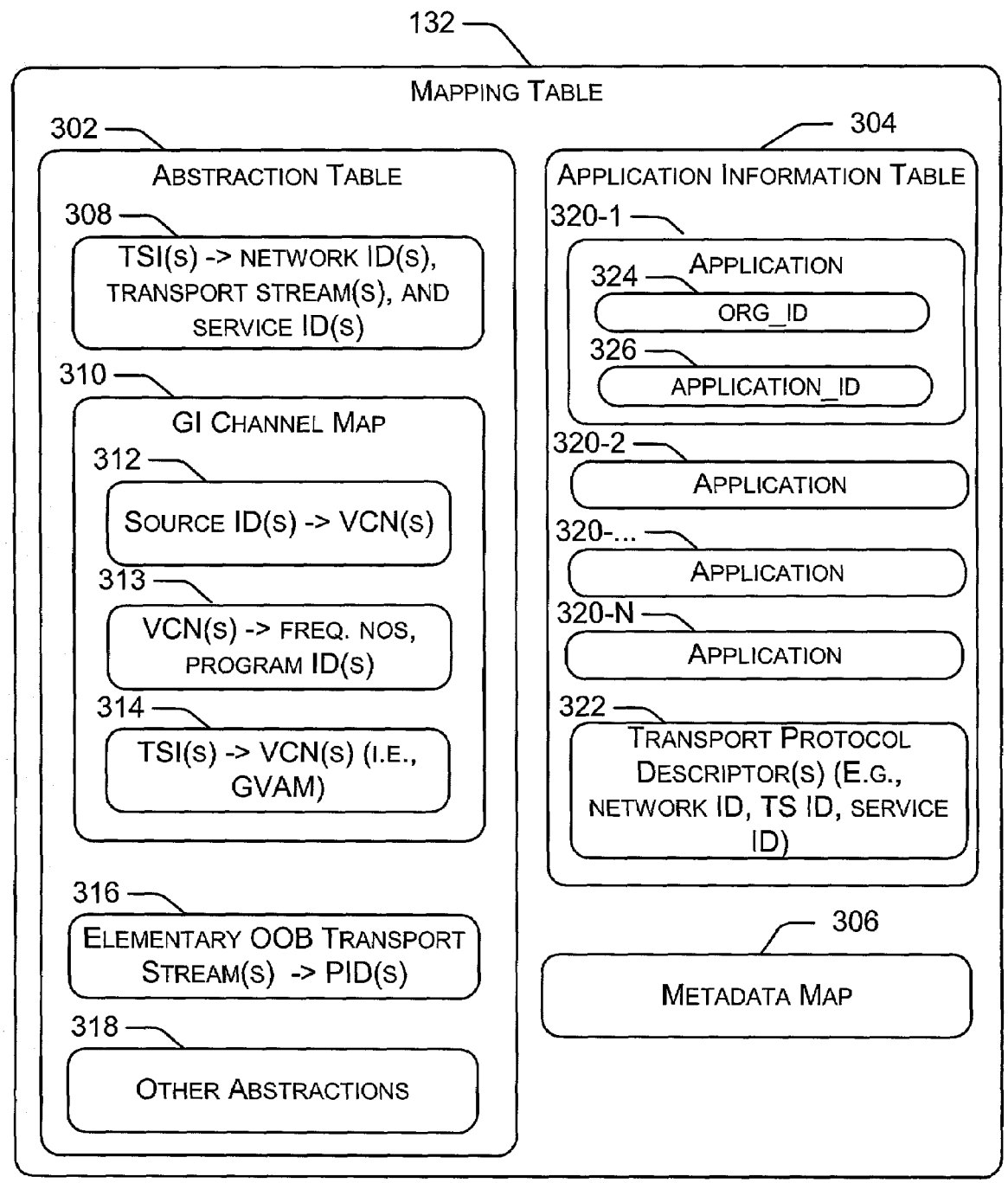
FIG. 3 shows aspects of an exemplary mapping table, which is generated at the head end and utilized by applications hosted by client device to resolve semantics of transport stream (TS) Universal Resource Locator (URL) syntax.

FIG. 3 shows aspects of an exemplary mapping table 132 utilized by an application 216 hosted by client device 114 to resolve TS URL 116 syntax semantics. For purposes of this discussion, semantics mapping table 132 components 302–306 are described using the exemplary TS URL syntax discussed above in reference to TABLE 1.

The semantics mapping table 132 includes at least a subset of the following information abstraction table 302, application information 304, and metadata map 306. Abstraction table 302 resolves a number of TS URL 116 syntactical abstractions to actual values or intermediate values used by one or more applications hosted by client device 114 to access resources across multiple networks based respectively different digital broadcast standards.

Application information 304 provides transport protocol descriptor information 320, and other application specific data 322 (i.e., organization and application identifiers). Metadata map 306 maps respective applications 322 to corresponding metadata (the metadata possibly being broadcast separately (e.g., over an OOB channel, etc.) from other aspects of the application (e.g., MPEG stills, etc.) to a client device 114).

Abstraction table 302 includes transport_stream_id (ITSI) to network_id and service_id mapping(s) 308 (i.e., <original_network_id>.<transport_stream_id>.<service_id> is abstracted by the identifier, <textual_service_identifier>). The format of the textual_service_identifer is <service_name>"."<service_provider_domain_name>. TABLE 3 shows aspects of an exemplary TSI map.

TABLE 3

Aspects of an Exemplary TSI Map 308

| Textual Service Identifer | Actual Mapping on MSO's network |
|---|---|
| Textual_service_identifer { service_provider_domain_name service_name } | <original_network_id>. <transport_stream_id>. <service_id> |
| 'Movie_Channel_1.HBO.com' | <0011>.<1345>.<2A3B> |
| 'News.NBC.com' | <0022>.<12AA>.<16CC> |
| 'Entertainment.NBC.com' | <0022>.<12FF>.<A456> |
| 'Sports.NBC.com' | <0033>.<AAFF>.<3333> |

TSI map 308 abstractions include the following element definitions:
- service_provider_domain_name—An internet DNS domain name that the service provider has rights to control. It is a globally unique registration mechanism, thereby allowing the textual_service_identifier to be globally unique.
- service_name—A unique name for the service within the service provider's domain.
- original_network_id—An indication of whether the carrier is terrestrial or cable to satellite. This information enables the client device 112 client to select an available tuner of the appropriate class (i.e., terrestrial, cable, or satellite).

The content provider supplies the TSI (textual_service_identifier) in a TS URL 116, for example, when referencing an EPG application. The head end 106 specifies the particular channel on which a program will be broadcast (i.e., the original_network_id, transport_stream_id, or service_id of the content or application referenced by the TS URL).

The same TSI may point to more than one instance of a service on different networks (cable, terrestrial, satellite). Hence, a single TSI may point to multiple instances of the sitcom "Friends" broadcast at different times of the day on different physical channels on an MSO's network (it is possible to have one-to-many mappings between the TSI and the <original_network_id>.<transport_stream_id>.<service_id>.

Consider the following example of how TSI map 308 data abstractions such as "textual_service_identifiers" may be represented in a TS URL 116 and be resolved based on contents of the TSI map 308. A content author is building an advertisement for the movie "Goblins and Games" to be broadcast later that week on a primary service "Movie Channel 1" of a cable channel provided by HBO®. The service provider or the head end 106 provides the content author with the textual_service_identifer "Movie_Channel_1.HBO.com", and event_id "0xAABB" representing "Goblins and Games". (The event_id, included in EPG data TV program information, is a substantially unique identifier used to resolve to a particular TV program (event) on the service within a transport stream).

For instance, EPG data may contain the following TS URL 116 hyperlink: "ts://'Movie_Channel_1.HBO.com'; AABB", which is associated with the movie "Goblins and Games" being advertised alongside a button "Record to DVR when movie is broadcast". When the user selects graphics, text, or hardware corresponding to the "Record . . . " button, an associated event handler at the client device 112 resolves the semantics of the TS URL to record the movie at the appropriate time (e.g., the time of broadcast is retrieved by the event handler from EPG data) after resolving the textual_service_identifer from information in TSI map 308.

Accordingly, applications, and/or other program data 108 of FIG. 1, having embedded TS URL(s) 116 do not have to be modified by content authors to update data abstractions subsequent to re-multiplexing. This is accomplished in part because a TS URL does not hard code a transport stream, service, or packet identifiers within TS URL syntax.

Referencing Services on a Transport Stream

As discussed above in reference to TABLE 1, the textual_service_identifier provides the mapping to a service on a transport stream on a particular network (cable, terrestrial, satellite). Hence, ts://<textual_service_identifier> is the TS URL 116 format for referencing services on a transport stream on a network. The resolved TS URL is of the form ts://<orginal_network_id>.<transport_stream_id>.<service_id>.

Referencing TV Programs

A TV program on a specific service within a transport stream on a network (cable, terrestrial, satellite) is referenced using the textual_service_identifier and an event_id in the TS URL 116. Hence, ts://<textual_service_identifier>;<event_id> is the TS URL format for referencing a TV program; the resolved TS URL is of the format ts://<orginal_network_id>.<transport_stream_id>.<service_id>;<event_id>.

The event_id is a cross-referencing mechanism between a TV program and associated descriptions. The event_id is an entry in a DVB-SI and ATSC-SI table that identifies a specific TV program within a service. Its value is decided at the time of building the SI tables and is therefore usually not known to the content author. The event_id is as changeable an identifier as the PID or source_id or transport_stream_id.

In DVB and ATSC, the role of event_id involves a few considerations. First, in cable SI tables, ATSC for cable does not mandate the presence of the Event Information Table (EIT) that carries the event_id. In DVB-cable, the event_id is used, but only the current and following events in each service are described and assigned event_ids. Secondly, when present, the scope of event_id is different in ATSC and in DVB. In ATSC, it is unique only within an Event Information Table (e.g., describing n number of hours of programming). In DVB, the event_id is unique within the service.

Referencing MPEG Content and/or Audio

MPEG content typically consists of pages authored in Scalable Vector Graphics (SVG) data format, which is written in XML. Each SVG page is associated with an MPEG still (the background image) and an audio track. The MPEG still is sent on a video packet identifier (PID) to be displayed on the video plane by a video decoder on client device 112. The audio track is sent on an audio PID that is rendered by the hardware audio decoder. An SVG page in MPEG content can reference the video PID and the audio PID of the associated MPEG still and audio track.

To accomplish this, the textual_service_identifier provides an abstraction to resolve to a specific service on a specific transport stream. The component_tag in the TS URL references a specific PID in this transport stream. The component_tag is part of an optional descriptor, the stream identifier descriptor that is associated with an elementary stream in the PMT (Program Map Table) in DVB. During re-multiplexing, even if the PID of an elementary stream changes, the associated stream identifier descriptor does not change. Thus, the component_tag is a reliable mechanism of referencing the elementary stream of interest within a transport stream.

If it is known that the PID of the elementary stream to be referenced will not change during re-multiplexing, then the PID of the elementary stream is directly referenced in the TS URL and the component_tag is not referenced in the URL.

An MPEG page can reference the associated MPEG-still and audio track using the TS URL as ts://<textual_service_identifier>.<component_tag>. The resolved URL is of the format ts:/<original_network_id>.<transport_stream_id>.<service_id>.PID_1. The TS URL ts://<textual_service_identifier>,<pid> is resolved to the format ts:/<original_network_id>.<transport_stream_id>.<service_id>,<pid>.

In one implementation, the stream identifier descriptor that carries the component_tag is a descriptor in the PMT for the elementary streams associated with the MPEG-still and audio track of an IMPEG application.

In ATSC, the equivalent of the component_tag is the association_tag that is part of the association_tag_descriptor associated with an elementary stream in the PMT, for use in DSM-CC. If the DSM-CC is not involved, the MSB of the association_tag in the association_tag_descriptor can be ignored. Then essentially, there is compatibility between the ATSC's association_tag and the DVB's component_tag in terms of syntax and semantics.

Referencing an Application Information Table

TS URL 116 syntax can reference an application information table (AIT) 304 of FIG. 3 (part of the mapping table 132 of FIG. 1) on an elementary stream within a transport stream. An AIT lists a collection of applications (e.g., applications 320, applications hosted by the client device 114, and so on) either on the current transport stream or another transport stream on the network as indicated by a corresponding transport descriptor 322. An elementary stream carries only one AIT at a time. However, an AIT is made up of sub-tables, one for each application type.

For example, MPEG content may wish to display the available collection of games on a specific service on the current transport stream. Assume that the collection of applications is described in the AIT carried in the MPEG-2 transport stream, and that the AIT comprises only one sub-table.

When a transport stream carries an AIT on one of its elementary streams, the associated PMT will exhibit that the stream type of the elementary stream carrying the AIT is some predetermined number (e.g., 0x05), and the elementary stream carrying the AIT will have an application signaling descriptor.

An AIT is referenced via a TS URL by using the textual_service_identifier to resolve to a specific service in a specific transport stream, and using the component_tag (reference to a PID) to identify the elementary stream that carries the AIT of interest.

An AIT in a given transport stream can reference applications on another transport stream via the transport protocol descriptor 322 (references a network_id, transport_stream_id and service_id) that is present in either the outer common loop of the AIT table or the inner application loop.

Hence, a TS URL 116 referencing an AIT is in either of the following formats:

(a) ts://'<textual_service_identifier>'.component_tag and the resolved TS URL on a particular network is of the format ts://<original_network_id>. <transport_stream_id>.<service_id>. component_tag, or
(b) ts://'<textual_service_identifier>',<pid> and the resolved TS URL on a particular network is of the format ts://<original_network_id>. <transport_stream_id>.<service_id>,<pid>.

TABLE 4

Aspects of an Exemplary Application Information Table 304

```
Outer Common Loop {
    transport_protocol_descriptor {
        network_id
        transport_stream_id
        service_id
    }
    Inner Application Loop {
        for each application {
            application_identifier (org_id, app_id)
        }
    }
}
```

Referencing a Service-Bound Application

A service-bound application is an application that is terminated when a client device 112 is tuned away from the service (e.g. channel change), unless the application is also listed in the AIT 304 of the new service tuned to. The TS URL 116 for referencing a specific service-bound application is of any of the three following syntaxes:

```
    (a) ts://<textual_service_identifier>:<application_reference>?
<cmd_line> that will resolve to
ts://<original_network_id>.<transport_stream_id>.<service_id>:<application_reference>?<cmd_line>, or
    (b) ts://'<textual_service_identifier>'.<component_tag>:<application_reference?>
<cm
d_line> that will resolve to
ts://<original_network_id>.<transport_stream_id>.<service_id>.<component_tag
>:<application_reference>?<cmd_line>, or (c)
ts://<textual_service_identifier>,<pid>:<application_reference?<cmd_line> that
will resolve to ts://<original_network_id>.<transport_stream_id>.<service_id>,
<pid>:<application_reference>?<cmd_line>.
```

The application_reference is a substantially globally unique identifier of the application and is encoded as a string in UTF-8 format. application_reference parsing operations are based on the particular network type on which the application is deployed (e.g., ATSC-DASE, DVB-MHP, OCAP, GI, and so on).

In the case of deployment of the application reference on DVB-MHP or OCAP or the GI network, the string format of the application_reference is generated as follows. Each application listed in an AIT has a mandatory application_identifier associated with it, comprising the numeric identifiers org_id 324 and app_id 326. The org_id refers to the 52 bit organization_id and the app_id refers to the 16 bit application_id. The application_reference is formed by concatenating the org_id and the app_id to form a single hexadecimal value, the org_id forming the most significant bits and the app_id forming the least significant bits. No extra leading zeroes are allowed and all characters are in lower case. In one implementation, the 52 bit org_id and 16 bit app_id is recovered by following the reverse procedure, and the application is looked up in the AIT by the [org_id, app_id].

Passing Parameters to an Application

The TS URL 116 also allows passing parameters to the application being referenced (bound or unbound) in the <cmd_line> component of the TS URL 116 that is also encoded in UTF-8. Arguments in the cmd_line are case-sensitive. An escape mechanism is specified when specifying arguments are separated from each other by white space in an application's command line. The escape mechanism used is "%HH". Thus, an application's command line of the form "-z-f-q" is written as "-z%20-f%20-q".

Referencing Objects on the Object Carousel

The path_segments in the TS URL 116 provide a mechanism to reference objects in an object carousel 126. TS URL syntax referencing an object on the object carousel is of the format:

```
ts://<textual_service_identifier>/ path_segments; or
ts://<textual_service_identifier>.<component_tag>/ path_segments; or
ts://'<textual_service_identifier>',<pid>/path_segments.
The resolved TS URL is of the format:
ts://<original_network_id>.<transport_stream_id>.<service_id>/
path_segments; or
ts://<original_network_id>.<transport_stream_id>.<service_id>.
<component_tag>/path_segments; or
ts://<original_network_id>.<transport_stream_id>.<service_id>,<pid>/
path_segments.
```

If an elementary stream is not referenced by the TS URL 116 (i.e., no component_tag or pid in URL), the path references an object in the first carousel within a service (based on the order of listing in the PMT). If the TS URL references an elementary stream that carries an object carousel stream, the path references an object in an object carousel whose "root" (DownloadServerInitiate—DSI message) is sent within that elementary stream.

Time of Resolution of the TS URL on the Client

Network administration at the head end 106 utilizing resource registration module 130 will resolve values of the network_id, transport_stream_id, and service_id of content being referenced by a TS URL 116 after re-multiplexing the content. Thus, entries in the textual_service_identifier mapping table 308 of FIG. 3 represent the current transports being broadcast by the head end.

If referenced content is yet to be broadcast, a corresponding TS URL 116 in some application or content hosted by a client device 114 may not have an entry in the mapping table 132 (i.e., TSI map 308 of FIG. 3) for an associated textual_service_identifier. In this case, these aspects of the TS URL will be resolved when the mapping table 132 is subsequently updated at some periodic time interval by the head end 106.

Resolution of TS URL on GI Network

This section describes the resolution of the TS URL 116 syntax according to the features of a GI network. Numeric identifiers are not used in the TS URL for referencing a service on a transport stream. Rather, the textual_service_identifier is used to reference a service on a transport stream. The problem is stated as follows: given a TS URL of the form ts://<textual_service_identifier>[.<component_ tag>] [<object>] or ts://<textual_service_identifier>,<pid>[<object>], what is the mechanism to resolve the TS URL to obtain a pointer to the referenced entity (e.g., a TV program, a bound or an unbound application, or a file on a carousel) on the GI network?

Mapping table 132, and specifically, GI channel map 310 of FIG. 3 include information used to map the textual_service_identifier in the TS URL 116 to an actual service on a transport stream on the GI network. GI channel map 310 includes source_id(s) to VCN(s) map 312, VCN(s) to frequency number(s) and program id(s) map 313, and TSI(s) to VCN(s) map 314 to resolve the textual_service_identifier of TS URL syntax to point to a service on the GI network.

A GI network's source_id is an abstract identifier that is associated with a service on a transport stream on the GI network. This source_id does not change even when the services are re-multiplexed, which may change values of elementary stream's identifiers (PIDs), service_ids or transport_stream_ids.

The virtual channel map (VCM) 313 maps the VCN to a specific transport stream identified by the frequency_number and a specific service within that transport stream identified by the program_number. What may change during re-multiplexing operations are the frequency_number and program_number associated with the Virtual Channel Number (VCN) that has a one-to-one mapping to the source_id. Hence a source_id or the VCN may be regarded as the reference to a service on a transport stream that is unaffected by re-multiplexing operations.

Re-multiplexing results in an update of mapping tables 312 and 313. Thus, a source_id always points to its corresponding service on the transport stream carrying the same content. For example, source_id 123 is assigned to broadcaster "A". No matter what the particular values of the frequency_number and program_number of the actual service that carries broadcaster A's channel, the source_id will always remain the same, which in this example, is 123.

The source_id is a number assigned by an entity such as Motorola to a content provider 102 and remains the same across all head end 106 networks. For example, if HBO® has the source_id 55 assigned to it, HBO's® source_id is 55 on any head end 106 network. The VCN is a number assigned by the head end 106 and its scope is only within that particular network. HBO's® VCN may be 20 on one head end network and 45 on another head end network. However, within a head end network, the VCN mapped to a source_id is unlikely to change. For example, if on a given MSO's network, HBO® is being shown on channel 58 (VCN=98), that is unlikely to change over time.

The textual_service_identifier is mapped to the VCN in table 314 on a GI network because a content provider 120 of applications and games is not mandated to apply for a source_id from the source_id assigning entity. For example, an MSN® service provider will develop its applications and games customized for each head end 106, and each head end can place the applications/games on any VCN that it chooses. The VCN is mapped by table 312 to a source_id from a pool of dummy values assigned to each head end (the GI network channel map requires that every VCN be associated with a source_id). The pool of dummy values will not conflict with the substantially globally unique source_ids assigned by the source_id assigning entity. In this case, MSN® does not have to bother applying for a source_id from the source_id assigning entity, especially if MSN® wishes to customize its content for each head end (in which case, the content provider 102 will have to apply for multiple source_ids).

A server group at the head end 106 utilizes the registration module 130 of FIG. 1 to generate these mappings 310, which are subsequently communicated to client devices 112 over an OOB channel. Since the GI network does not allow the insertion of tables on the OOB, the mappings 310 are sent as an electronic file 132. The head end server 120 updates these mappings 310 to represent any re-multiplexed content information.

Information that is needed for the GI network to map a textual_service_identifier to a specific service on a specific transport stream are summarized in TABLE 5.

TABLE 5

Information to Map a TSI to a Virtual Channel Number Identifying a Specific Service or a Specific Application

| Mapping Name | Textual_service_identifier→ VCN (GVAM) | VCN→ [Frequency_no, Program_no] |
|---|---|---|

TABLE 5-continued

Information to Map a TSI to a Virtual Channel Number Identifying a Specific Service or a Specific Application

| | VCN→ Dummy Source ID |
|---|---|

These mappings (i.e., information provided by mapping table 310 of FIG. 3) provide a mechanism to resolve a textual_service_identifier to a specific service on a transport stream identified by [frequency_number, program_number]. That is, the textual_service_identifier→VCN→[frequency_number, program_number]. Thus, ts:/<textual_service_identifier> would resolve to [frequency_number, program_number]. For example, ts://Movie_channel_1. HBO.com resolves to [35, 3]. If all the transport streams are on the same network (e.g., the GI network), resolution of the textual_service_identifier returns only frequency_number (specific to a transport stream) and program_number (specific to a service on that transport stream).

Additionally, TABLE 5 illustrates that a VCN is mapped to a specific source ID of an application that is being hosted at the client device 114 (e.g., an EPG application hosted in ROM or flash).

VCN to source ID mappings of TABLE 5 (i.e., mapping table 132) can be used: (a) to launch one application hosted by client device 113 from another application hosted by the client device (e.g., such as from an EPG menu); (b) for program to program navigation; (c) for application page to page navigation; (d) to provoke a force tune at client device 114 directly from an currently executing program, etc. These and other examples of using a TS URL to access local and remote applications, data, and so on are now described. Although the following examples utilize a TSI→(i.e., to) VCN→Source ID mapping, it can be appreciated that the mapping table 132 may include a straight VCN→Source ID mapping without the additional level of indirection provided by the TSI abstraction (E.g., the Motorola Channel Map).

VCN to source ID mapping is used to launch one application hosted by client device 113 from another application hosted by the client device (e.g., such as from an EPG menu.) For instance, the following TS URL syntax ts://<TSI>:<application reference>?<path/startPage.svg>. Note that the TSI here corresponds to the channel conveying the mapping table table 132, which contains the launched application's information.

VCN to source ID mapping is also used for program to program navigation. For instance, the following TS URL 116, which is embedded in source content 112, points to a page in a different program: ts://<TSI>/<path/targetPage.svg>. The TSI in this example, specifies an abstraction to a file. The "path" is a sequence of symbols and names that identifies a file, which in this example, is "targetPage.svg". Every file has a name, called a filename, so the simplest type of "path" is just a filename. (An *.svg file is a Scalable Vector Graphics (SVG) file, which is written in XML).

VCN to source ID mapping is also used for application page to page navigation. For example, the following TS URL 116 is used to navigate from one program page to another within the same MPEG Program: ts://<path/targetPage.svg>. As before, this TS URL is embedded directly into MPEG source content 112 on a hot-spot that points to another page in the same content.

VCN to source ID mapping is also used to launch another client 114 hosted application 118 from within an different application 118. A example of this would be a hot-spot that in an MPEG program that launches a VOD session with a TS URL 116 such as ts://<TSI>:<application reference>?<application parameter1>?<application parameter2> . . . . This TS URL 116 is encoded directly in the MPEG content on a hot-spot used to start the VOD session.

VCN to source ID mapping is also used to force tune a client device 114 to a different resource. For instance, a TS URL 16 of the following format provokes a force tune directly from an particular resource (e.g., an MPEG program 118) to another resource (118 or 112): ts://<TSI>

Referencing a TV Program

The event_id in TS URL 116 syntax is used to reference a specific TV program on a given service. Since the GI network does not carry any SI tables, the role of the event_id is fulfilled by an identifier such as a Tribune identifier, Tribune_id. (The Tribune Corporation is a content provider that generates content for ITV networks). Tribune_id is assigned to each TV program described in EPG data (i.e., program data 108) generated by an EPG provider such as Tribune Media Services. Tribune_id may be regarded as a substantially unique identifier within the scope of a service in a transport stream, and serves the purpose of an event identifier so that it may be used in the TS URL 116 for referencing a specific TV program.

Hence, ts:/<textual_service_identifier>;Tribune_id is resolved to [frequency_number, program_number, Tribune_id]. By looking up the Tribune_id in the EPG, the actual TV program is located. For example, ts://Primary_channel. NBC.com;38934 will resolve to [35, 2, Friends at 4.00pm on Friday].

Referencing Elementary Streams

MPEG content consists of SVG pages, each of which is associated with a background image coded as an MPEG still and an audio track. The MPEG still and the audio track are on separate elementary streams each identified by a respectivePID (changeable during re-multiplexing) and a component_tag (not affected by re-multiplexing). A TS URL 116 on an SVG page in MPEG references the associated MPEG still in either of two manners of format:

```
ts://<textual_service_identifier>. <component_tag>and is resolved to
[frequency_number, program_number, PID]; or
ts://<textual_service_identifier>, <pid>--
``` and is resolved to [frequency_number, program_number, PID] at the client device 112 looking up the GI Channel Map, the GVAM and the PMT on the specific transport stream. For instance, the following algorithm of TABLE 2 provides an exemplary PMT look-up to map a component_tag to a PID.

TABLE 2

An Exemplary PMT Look-Up to Map a Component_Tag to a PID

```
PMT {
    for each elementary stream {
        stream_type
        PID
        Stream_identifier_descriptor {
```

TABLE 2-continued

An Exemplary PMT Look-Up to Map a Component_Tag to a PID

```
            Component_tag
        }
    }
}
```

If it is known that the PID of an elementary stream being referenced will not change due to any re-multiplexing, then the PID is used to directly reference an elementary stream in the TS URL 116.

The OOB on the GI network 110 is a transport stream with no notion of a service, but only of elementary streams. It is assumed that there is only one service on the OOB transport stream. Each elementary stream on the OOB transport stream is tagged by both a text string and a PID. The mapping between the text string and the PID of an elementary stream on the OOB is generated and inserted into mapping table 132 (specifically into the elementary OOB TS to PID mapping table 316 of FIG. 3) at the head end 106.

TS URL 1116 syntax: ts://oob . . . , refers to a single service in the OOB. To reference elementary streams on the OOB using the TS URL, mapping table 132 maps the component_tag (specified in the URL) to the text_string assigned to each elementary stream by the MSO. This mapping is required because the component_tag and text_string of an elementary stream have different respective formats, though they serve the same purpose (to abstract the PID of the elementary stream).

Resolution of TS URL 116 syntax referencing an elementary stream on the OOB on the GI network is as follows. The TS URL of the form ts://oob.<component_tag> will resolve to [out-of-band channel, PID]. The mappings are of the form: Component_tag→text_string; and text_string→PID. The first portion of this mapping is not defined on a GI networks.

Referencing a Service Bound Application

A service bound application that is referenced by TS URL 116 syntax has the following format: ts://<textual_service_identifier>:<application_reference>, which is resolved to [frequency_number, program_number, pointer to application with matching org_id and app_id in the AIT 304 of FIG. 3 carried on that service]. Where a specific elementary stream in the service is referenced, the following is also allowed:

ts://<textual_service_identifier>.<component_tag>:<application_reference>, which is resolved to [frequency_number, program_number, PID of elementary stream on service, pointer to application with matching org_id and app_id in the AIT 304 carried on that elementary stream].

The org_id and app_id are recovered from the string format of the application_reference by following a set of rules. First, the org_id bits are the most significant bits of the application_reference. Second, the app_id bits are the least significant bits of the application_reference. Next, there are no extra leading zeroes in the application_reference. Lastly, all characters are in lower case.

The AIT carried on the service associated with the [frequency_number, program_number] will list the application identified by the application_identifier [org_id.appjd]. The usage of the AIT is the same as in DVB-MHP.

Referencing a Service Unbound Application

A service unbound application is one that persists even after the currently tuned service is changed to a new service, perhaps on a different transport stream. In one implementation, a service unbound application is always carried in OOB channel that the system is always tuned to (e.g., a fixed tuner with constant access to the OOB channel) on the GI network (this section applies to GI networks). The mapping table 132 maps applications/programs to their respective resources/metadata that are carried in the OOB (each application is associated with an organization_id and an application_id that comprise the application identifier).

The TS URL 116 syntax is of one of these formats:

```
ts://oob:<application_reference>;
ts://oob.<component_tag>:<application_reference>; or
ts://oob,<pid>:<application_reference>.
```

The process of recovering org_id and the app_id from the application_reference to look up the application in the mapping table 132 is the same as discussed above with respect to service bound applications.

An Exemplary Procedure

Figure 4:
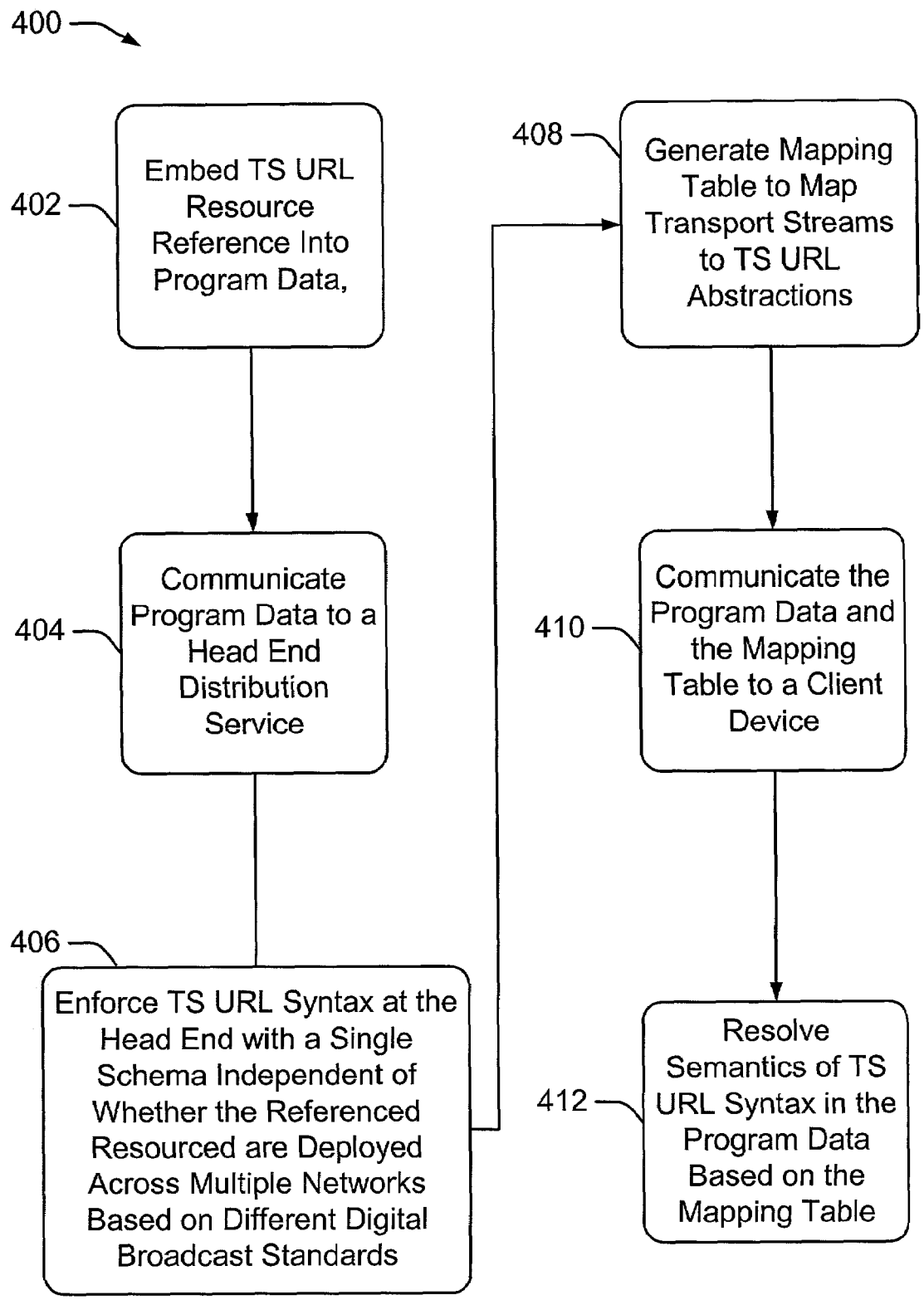
FIG. 4 shows an exemplary procedure to reference resources in a television-based entertainment system.

FIG. 4 shows an exemplary procedure 400 to reference resources in a television-based entertainment system. For purposes of this discussion, the operations of procedure 400 are described with reference to various components of system 100 of FIG. 1.

At block 402, one or more content providers 102 of FIG. 1 embed one or more TS URL 116 references to any number of the resources into program data 108. Program data represents information that facilitates ITV functionality for any combination of networks (e.g., cable, terrestrial, and/or satellite networks). At block 404, the content provider(s) communicates the program data having embedded TS URLs over a network 104 to a head end distribution service 106.

At block 406, the head end service 106 enforces TS URL 116 syntax based on a single TS URL schema 128, independent of whether embedded TS URL references to resources are deployed across multiple networks based on different digital broadcast standards. At block 408, the head end service generates mapping table 132 to map actual digital broadcast transport stream information to TS URL syntactical abstractions.

At block 410, the head end service 106 communicates source content 112 and the mapping table to one or more client devices 114. At block 412, responsive to invocation of a TS URL at the client device (e.g., by user selection of graphics, text, or hardware corresponding to a TS URL embedded in the content) semantics of the invoked TS URL syntax are resolved according to information provided in the communicated mapping table.

An Exemplary Client Computing Environment

Figure 5:
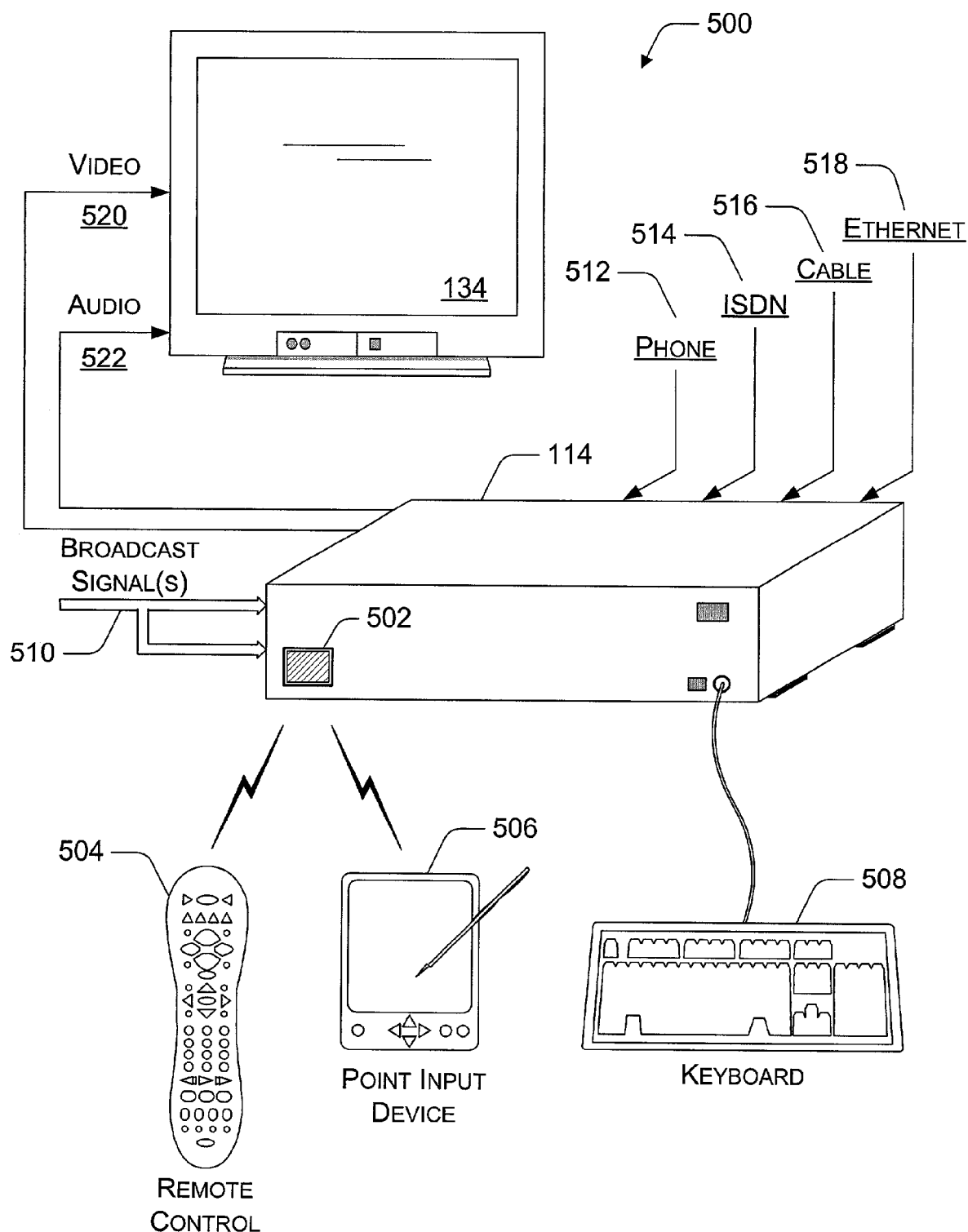
FIG. 5 illustrates an exemplary implementation of a client device shown as a standalone unit that connects to a television.

FIG. 5 illustrates an exemplary implementation 500 of a client device 114 shown as a standalone unit that connects to a television 134. As used herein, "client device" means any electronic device having data communications, data storage capabilities, and/or functions to process signals, such as broadcast signals, received from any of a number of different sources.

Client device 114 is implemented in any number of embodiments, including as a set-top box, a satellite receiver, a TV recorder with a hard disk, a game console, an information appliance, and so forth. Client device 114 includes a wireless receiving port 502, such as an infrared (IR) or Bluetooth wireless port, for receiving wireless communications from a remote control device 504, a handheld input device 506, or any other wireless device, such as a wireless keyboard. Handheld input device 506 is a personal digital assistant (PDA), handheld computer, wireless phone, or the like. Additionally, a wired keyboard 508 is coupled to communicate with the client device 114. In alternate embodiments, remote control device 504, handheld device 506, and/or keyboard 508 may use an RF communication link or other mode of transmission to communicate with client device 114.

Client device 114 receives one or more broadcast signals 510 from one or more broadcast sources, such as from a satellite or from a broadcast network. Client device 114 includes hardware and/or software for receiving and decoding broadcast signal 510, such as a NTSC, PAL, SECAM or other TV system video signal. Client device 114 also includes hardware and/or software for providing the viewer with a graphical user interface by which the viewer can, for example, access various network services, configure the client device 114, and perform other functions.

Client device 114 is capable of communicating with other devices via one or more connections including a conventional telephone link 512, an ISDN link 514, a cable link 516, and an Ethernet link 518. Client device 114 may use any one or more of the various communication links 512–318 at a particular instant to communicate with any number of other devices.

Client device 114 generates video signal(s) 520 and audio signal(s) 522, both of which are communicated to television 134. The video signals and audio signals are communicated from client device 114 to television 134 via an RF (radio frequency) link, S-video link, composite video link, component video link, or other communication link. Although not shown in FIG. 5, client device 114 may include one or more lights or other indicators identifying the current status of the device. Additionally, the client device may include one or more control buttons, switches, or other selectable controls for controlling operation of the device.

CONCLUSION

The described arrangements and procedures provide for referencing resources in a television-based entertainment system. Although the arrangements and systems to reference resources in a television-based entertainment system have been described in language specific to structural features and methodological operations, the arrangements and procedures as defined in the appended claims are not necessarily limited to the specific features or operations described. Rather, the specific features and operations are disclosed as preferred forms of implementing the claimed subject matter.

The invention claimed is:

1. A computer-based method comprising:
   receiving, by a client device, source content comprising one or more embedded references to resources identified via unique syntactical abstractions; and
   determining, by the client device, actual values of the unique syntactical abstractions in syntax of the embedded references, the unique syntactical abstractions representing at least a subset of abstractions enforceable by a single schema to reference resources independent of particular criteria used by networks associated with different respective digital broadcast standards to reference deployed resources effective to allow an individual unique syntactical abstraction to be referenced to multiple deployed resources, wherein the embedded references to deployed resources are transport stream universal resource locators (TS URL), the transport universal resource locators comprising:
a name space notation;
an original network identifier that identifies an original carrier of a transport stream;
a transport stream identifier that uniquely identifies the transport stream within a terrestrial, cable, or satellite network;
a service identifier that uniquely identifies a service or a program within the transport stream;
either component tags or packet identifiers, each component tag for identifying an elementary stream with the transport stream and each packet identifier for uniquely identifying the elementary stream within the transport stream and is defined in a program map table for individual elementary streams in the transport stream; and,
one of an event identifier that identifies an event within the service, an application reference that uniquely identifies the application, and a path identifier that references an object in an object carousel within the service if the URL identifies a service.

2. A method as recited in claim 1, wherein the client device is a set-top box.

3. A method as recited in claim 1, wherein at least one of the resources is embedded in non-volatile memory of the client device.

4. A method as recited in claim 1, wherein at least one of the resources is a hardware aspect of the client device.

5. A method as recited in claim 1, wherein a first resource of the resources is deployed by a first network server using a first digital network broadcasting protocol, and wherein a second resource of the resources is deployed by a second network server using a second digital network broadcasting protocol that is different than the first digital network broadcasting protocol.

6. A method as recited in claim 1, wherein a resource of the resources is deployed locally by the client device, and wherein the method thrther comprises launching the resource.

7. A computer-implemented method comprising:
embedding a resource referencing mechanism into program data, the resource referencing mechanism providing syntactical abstractions to reference resources deployed on networks independent of whether a first network of the networks references resources using a first standard that is different from a second standard used by a second network to reference resources, wherein the resource referencing mechanism comprises a name space notation, an original network identifier that identifies an original carrier of a transport stream, a transport stream identifier that uniquely identifies the transport stream within a terrestrial, cable, or satellite network, and a service identifier that uniquely identifies a service or a program within the transport stream;
communicating the program data to a client device; and
resolving, by the client device, semantics of the resource referencing mechanism to access at least one resource of the resources, the semantics being resolved using a single schema;
wherein the resolving is performed by a first application, and wherein at least a subset of the resources corresponds to one or more of: a forced tune, by the client device, to a broadcast channel; a second application hosted by the client device; and navigation from a first page of the first application to a second page of the first application.

8. A method as recited in claim 7, wherein the client device is a set-top box.

9. A method as recited in claim 7, wherein the embedding further comprises:
mapping an abstraction to a GI virtual channel number;
communicating a mapping table to the client device to resolve semantics of syntax of the resource referencing mechanism.

10. A method as recited in claim 7, wherein the embedding further comprises mapping an elementary transport stream abstraction in the resource referencing mechanism to a packet identifier to reference at least one resource of the resources.

11. A computer-based method comprising:
accessing a single schema to enforce syntax rules of a resource referencing mechanism, the resource referencing mechanism abstracting at least a subset of specific syntax used by multiple different digital broadcast network resource referencing criteria and comprising either component tags or packet identifiers, each component tag for identifying an elementary stream with a transport stream and each packet identifier for uniquely identifying the elementary stream within the transport stream and is defined in a program map table for individual elementary streams in the transport stream, and further comprising one of an event identifier that identifies an event within a service, an application reference that uniquely identifies an application, and a path identifier that references an object in an object carousel within the service if the resource referencing mechanism identifies the service;
receiving source content from a content provider, the source content comprising a resource reference based on the resource referencing mechanism;
enforcing syntax of the resource reference against the single schema to access one or more resources;
creating an electronic file that maps an abstraction of the resource referencing mechanisms to a transport stream; resolving the abstraction against actual data values that identify the transport stream; and communicating the electronic file to an application hosted by the client device, the electronic file for evaluation by the application to resolve any abstractions included in the reference against the actual data values, the actual data values being used to tune the client device to the resource.

12. A method as recited in claim 11, wherein operations of accessing the single schema, receiving the source content, and enforcing the syntax are performed by a set-top box.

13. A method as recited in claim 11, wherein the resource referencing mechanism is a transport stream referencing mechanism.

14. A method as recited in claim 11, wherein a first resource of the resources is deployed on a first network based on a first digital broadcast standard, and wherein a second resource of the resources is deployed on a second network based on a second digital broadcast standard that utilizes a different resource referencing mechanism than the first digital broadcast standard.

15. A computer-readable medium for referencing locally and remotely deployed resources in a digital broadcast network, the computer-readable medium comprising computer-executable instructions executable by a processor and for:

receiving, by a client device, source content comprising one or more embedded references to resources, the references comprising:
  a service identifier that uniquely identifies a service or a program within the source content;
  one of an event identifier that identifies an event within the service, an application reference that uniquely identifies an application, and a path identifier that references an object in an object carousel within the service if the reference identifies the service; and
determining, by the client device, actual values of syntactical abstractions in syntax of the embedded references to access at least one resource of the resources, the syntactical abstractions comprising a least a subset of abstractions used to reference resources deployed by respective ones of multiple networks independent of different resource referencing syntax standards used by the respective ones;
wherein the instructions for determining the actual values further comprise instructions for evaluating a mapping table generated by a head end of the digital broadcast network, the mapping table correlating at least one syntactical abstraction to a respective source identifier corresponding to a resource of the resources.

16. A computer-readable medium as recited in claim 15, wherein the client device is a set-top box.

17. A computer-readable medium as recited in claim 15, wherein the embedded references are transport stream (TS) Universal Resource Locator (URL) references.

18. A computer-readable medium as recited in claim 15, wherein at least one of the resources is embedded in nonvolatile memory of the client device.

19. A computer-readable medium as recited in claim 15, wherein at least one of the resources is a hardware aspect of the client device.

20. A computer-readable medium as recited in claim 15, wherein the at least one resource is an object of the client device, the object being controlled by a service on a transport stream, an elementary stream within a service, an in-band or out-of-band carousel on a transport stream, an object or file on a carousel, or an application either on a current transport stream or any other transport stream.

21. A computer-readable medium as recited in claim 15, wherein a first resource of the resources is deployed by a first network server using a first resource referencing syntax that is compatible with a first digital broadcasting protocols, and wherein a second resource of the resources is deployed by a second network server using a second resource referencing syntax that is compatible with a second digital network broadcasting protocol and not compatible with the first resource referencing syntax.

22. A computer-readable medium as recited in claim 15, wherein for said determining, the client device uses mapping table to correlate at least one specific vital channel number (VCN) to a source identifier for a resource of the resources.

23. A computer-readable medium as recited in claim 15, wherein a resource of the resources is deployed locally by the client device, and wherein the instructions further comprises instructions for launching the resource.

24. A computer-readable medium comprising computer-executable instructions for execution by a processor to reference resources in a television-based entertainment system, the computer-executable instructions comprising instructions for:
  embedding a resource referencing mechanism into program data, the resource referencing mechanism providing syntactical abstractions to reference resources deployed on networks independent of whether a first network of the networks references resources using a first standard that is different from a second standard used by a second network to reference resources, wherein the resource referencing mechanism comprises a name space notation, an original network identifier that identifies an original carrier of a transport stream, a transport stream identifier that uniquely identifies the transport stream within a terrestrial, cable, or satellite network, and a service identifier that uniquely identifies a service or a program within the transport stream;
  communicating the program data to a client device; and
  resolving, by the client device, semantics of the resource referencing mechanism to access at least one resource of the resources, the semantics being resolved;
  wherein the resolving is performed by a first application, and wherein at least a subset of the resources corresponds to one or more of: a forced tune, by the client device, to a broadcast channel; a second application hosted by the client device; and navigation from a first page of the first application to a second page of the first application.

25. A computer-readable medium as recited in claim 24, wherein the client device is a set-top box.

26. A computer-readable medium comprising computer-executable instructions for execution by a processor, the computer-executable instructions comprising instructions for:
  receiving source content from a content provider, the source content comprising one or more resource references based on a resource referencing mechanism, a single schema being used to enforce syntax rules of the resource referencing mechanism, the resource referencing mechanism abstracting at least a subset of specific syntax used by multiple different digital broadcast network resource referencing criteria, the resource referencing mechanism comprising component tags for identifying an elementary stream within a transport stream of the source content;
  enforcing syntax of the resource references against the single schema to access one or more resources;
  creating an electronic file that maps an abstraction of the resource referencing mechanisms to a transport stream; resolving the abstraction against actual data values that identify the transport stream; and communicating the electronic file to an application hosted by the client device, the electronic file for evaluation by the application to resolve any abstractions included in the reference against the actual data values, the actual data values being used to tune the client device to the resource.

27. A computer-readable medium as recited in claim 26, wherein the client device is a set-top box.

28. A computer-readable medium as recited in claim 26, wherein the multiple different digital broadcast network resource referencing criteria are associated with at least two of the following standards: Digital Video Broadcasting, OpenCable™ Applications Platform, Advanced Television Systems Committee, National Television Standards Committee, and GI Motorola standards.

29. A computer-readable medium as recited in claim 26, wherein the instructions for creating an electronic file further comprise instructions for mapping abstractions in the resource referencing mechanism to a GI virtual channel number for resolving semantics of the reference.

30. A computer-readable medium as recited in claim 26, wherein the instructions for creating an electronic file further comprise instructions for mapping elementary transport stream abstractions in the resource referencing mechanism to a packet identifier for resolving semantics of the reference corresponding to a resource on a GI network.

31. A computing device for referencing locally and remotely deployed resources in a digital broadcast network, the computing device comprising:
   a processor; and
   a memory coupled to the processor, the memory comprising computer-executable instructions for execution by a processor and comprising instructions for:
      receiving, by a client device, source content comprising one or more embedded references to resources, individual embedded references comprising transport stream universal resource locators (TS URL) that include a name space notation, an original network identifier that identifies an original carrier of a transport stream, and a transport stream identifier that uniquely identifies the transport stream within a terrestrial, cable, or satellite network;
      determining, by the client device, actual values of at least a subset of syntactical abstractions in syntax of the embedded references, the syntactical abstractions representing different syntaxes to reference resources on respective ones of multiple different networks based on different respective digital broadcast standards;
   and wherein a first reference of the embedded references is based on a first syntax rule to access a corresponding resource deployed on a first network based on a first digital broadcasting protocol, and wherein a second reference of the embedded references is based on a second syntax rule that is not the same as the first syntax rule, the second syntax rule being used to access a corresponding resource deployed on a second network based on a second digital broadcasting protocol that is not the first digital broadcasting protocol.

32. A computing device as recited in claim 31, wherein the client device is a set-top box.

33. A computing device as recited in claim 31, wherein at least one of the resources is embedded in non-volatile memory of the client device.

34. A computing device as recited in claim 31, wherein at least one of the resources is a hardware aspect of the client device.

35. A computing device as recited in claim 31, wherein a mapping table correlates at least one specific virtual channel number (VCN) to a source identifier for a resource of the resources.

36. A computing device as recited in claim 31, wherein a resource of the resources is deployed locally by the client device, and wherein the instructions further comprises instructions for launching the resource.

37. A computing device as recited in claim 31, wherein the instructions for determining the actual values further comprise instructions for evaluating a mapping table generated by a head end of the digital broadcast network, the mapping table correlating at least one syntactical abstraction to a respective source identifier corresponding to a resource of the resources.

38. A computing device as recited in claim 31, wherein the instructions for determining the actual values further comprise instructions for:
   evaluating a mapping table generated by a head end of the digital broadcast network, the mapping table correlating one or more virtual channel numbers to respective source identifiers; and
   resolving syntactical semantics of at least one reference of the references based on the one or more virtual channel numbers and respective source identifiers to access at least one of the resources.

39. A computing device to reference resources in a television-based entertainment system, the computing device comprising:
   a processor; and
   a memory coupled to the processor, the memory comprising computer-executable instructions for execution by a processor and comprising instructions for:
      embedding a resource referencing mechanism into program data, the resource referencing mechanism providing syntactical abstractions to reference resources deployed on networks independent of whether a first network of the networks references resources using a first standard that is different from a second standard used by a second network to reference resources, wherein the resource referencing mechanism comprises a name space notation, an original network identifier that identifies an original carrier of a transport stream, a transport stream identifier that uniquely identifies the transport stream within a terrestrial, cable, or satellite network, and a service identifier that uniquely identifies a service or a program within the transport stream;
      communicating the program data to a client device; and
      resolving, by the client device, semantics of the resource referencing mechanism to access at least one resource of the resources, the semantics being resolved using a single schema;
   wherein the syntactical abstractions abstract syntax criteria to access resources deployed by multiple networks, a first network of the multiple networks being configured to reference resources using first syntax criteria to reference resources deployed on the first network, the first syntax criteria being different that any syntax criteria used to reference resources deployed by at least one other network of the multiple networks.

40. A computing device as recited in claim 39, wherein the client device is a set-top box.

41. A computing device as recited in claim 39, wherein the resolving is performed by a first application, and wherein at least a subset of the resources corresponds to one or more of:
   a forced tune, by the client device, to a broadcast channel;
   a second application hosted by the client device; and
   navigation from a first page of the first application to a second page of the first application.

42. A computing device to reference resources in a television-based entertainment system, the computing device comprising:
   a processor; and
   a memory coupled to the processor, the memory comprising computer-executable instructions for execution by a processor and comprising instructions for:
      receiving source content from a content provider, the source content comprising one or more resource references based on a resource referencing mechanism, a single schema being used to enforce syntax rules of the resource referencing mechanism, the resource referencing mechanism abstracting at least a subset of specific syntax used to reference resources across networks, each network being based on a particular one protocol of multiple different digital broadcast protocols, the resource referencing mechanism comprising component tags for identifying an elementary stream within a transport stream of the source content;

enforcing syntax of the resource references against the single schema to access one or more resources;

creating an electronic file that maps an abstraction of the resource referencing mechanism to a virtual channel number that corresponds to a source id of the resource, wherein the creating an electronic file further comprising mapping elementary transport stream abstractions in the resource referencing mechanism to a packet identifier for resolving semantics of the reference corresponding to the resource, and wherein the resource is deployed on the network, the network being based on GI network digital broadcast standards; and communicating the electronic file to an application hosted by the client device, the electronic file for evaluation by the application to resolve the abstraction to the virtual channel number and the source id to access the resource.

43. A computing device as recited in claim 42, wherein the client device is a set-top box.

44. A computing device as recited in claim 42, wherein the multiple different digital broadcast protocols are associated with at least two of the following standards: Digital Video Broadcasting, OpenCable™ Applications Platform, Advanced Television Systems Committee, National Television Standards Committee, and GI Motorola standards.

* * * * *